Nov. 15, 1932. F. W. HARNEY 1,887,758
APPARATUS FOR MAKING PRODUCTS FROM PLASTIC MATERIAL
Filed March 11, 1931
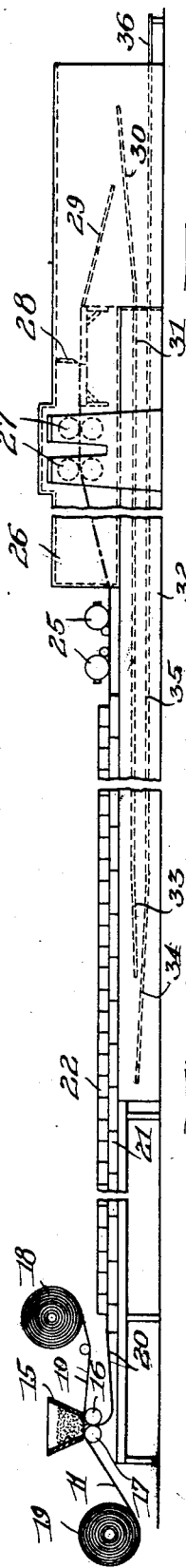
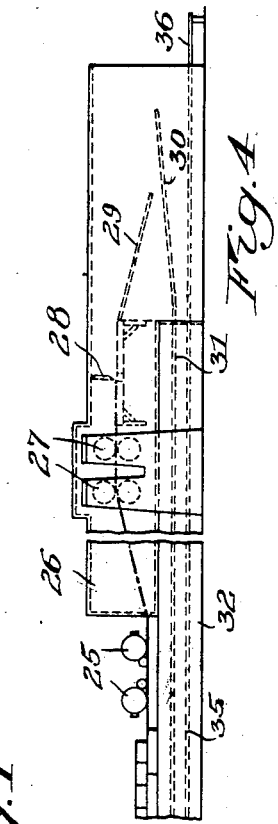
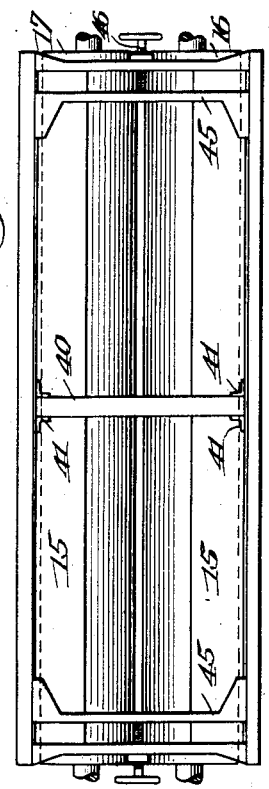
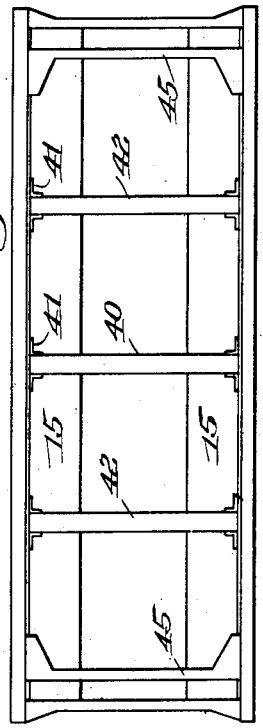
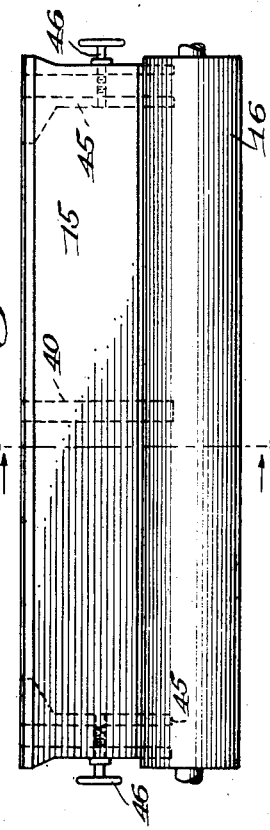
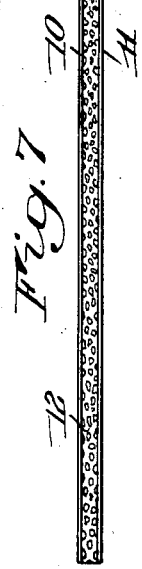
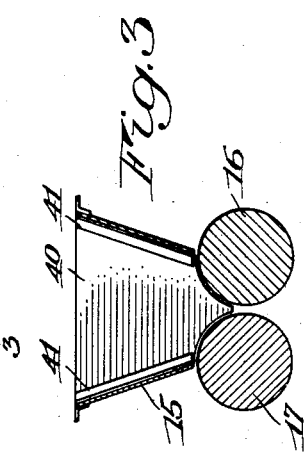
INVENTOR
Francis W. Harney
BY Edward H. Cumpston
his ATTORNEY Patented Nov. 15, 1932

1,887,758

UNITED STATES PATENT OFFICE

FRANCIS W. HARNEY, OF LOCKPORT, NEW YORK, ASSIGNOR TO THE UPSON COMPANY, OF LOCKPORT, NEW YORK, A CORPORATION OF NEW YORK

APPARATUS FOR MAKING PRODUCTS FROM PLASTIC MATERIAL

Application filed March 11, 1931. Serial No. 521,772.

This invention relates to a method for making articles from plastic material, such for example as wallboard, and to a machine for carrying out the method.

An object of the invention is the provision of a generally improved method which is more satisfactory than those previously known, and of an improved and more satisfactory machine for carrying out the method.

Another object of the invention is the provision of a method which is satisfactory for use in the making of relatively wide pieces or strips of material.

Still another object is the provision of a method especially adapted for the manufacture of wallboard by a substantially continuous process, by which method satisfactory wallboard may be made of relatively great width.

A further object is the provision of a machine which will produce satisfactory wallboard of relatively great width, in an economical and continuous manner.

To these and other ends the invention resides in certain improvements and combinations of parts, all as will be hereinafter more fully described, the novel features being pointed out in the claims at the end of the specification.

In the drawing:

Fig. 1 is a diagrammatic side elevation of a machine constructed in accordance with a preferred embodiment of the invention;

Fig. 2 is a side elevation of the forming rolls and feed hopper of the machine;

Fig. 3 is a transverse section taken substantially on the line 3—3 of Fig. 2;

Fig. 4 is a plan of the parts shown in Fig. 2;

Fig. 5 is a view similar to Fig. 4, with parts omitted, illustrating a modification of the invention by the use of additional partitions;

Fig. 6 is a diagrammatic cross section through a board substantially immediately after it leaves the forming rolls, and Fig. 7 is a diagrammatic cross section through the same board after it has been intumesced in the platens.

Similar reference numerals throughout the several views indicate the same parts.

The method of the present invention relates to the manufacture of various articles from plastic material and will be described with particular reference to the manufacture of wallboard, although it is to be understood that other articles or products in addition to wallboard may also be made.

According to the present method, plastic material is placed as a filling or core between two liner sheets, and the composite structure of filling and liner sheets is then subjected to heat. Plastic fillings of a kind suitable in this connection ordinarily contain vaporizable substances, such as moisture which will form steam upon heating.

The formation of the vapor during the step of heating creates internal pressures in the product which tend to distort it by forcing the liner sheets away from each other, splitting the core or filling. In some instances, and especially when the product is being made in relatively narrow widths such as four feet, for example, the internal pressures formed in this way are found to be not greatly detrimental, and can be controlled to a sufficient extent, as for example by confining the material between platens during part of the heating operation.

When the material is made in relatively great widths, such for example as widths of eight feet, it is found that there is a considerable tendency for the liners to be distorted or forced away from each other, and the distorting tendency is so great that it cannot be satisfactorily controlled by the methods which have heretofore been used in making a narrow product. Even if platens are used to confine the product during heating, the liners will be forced away from each other to some extent after the product emerges from the platens (unless the platens are of excessive and uneconomical size or length), so that the resulting product is imperfect and in many cases entirely useless.

The exact cause of this phenomenon in the manufacture of a wide product is not known with certainty, although it seems probable that it is due to the internal pressure developed by vaporization of moisture in the plastic filling. It also seems probable that the reason this is so much more pronounced in the case of a wide product than in the case of a narrow product, is that the vapor causing the pressure can escape only with considerably more difficulty, because it must force its way through a much greater distance of plastic material from a point near the center of the product to the exposed edge thereof than when the material is substantially narrower. At any rate, whatever the exact cause may be, it is a fact that in actual use the liners are forced apart after leaving the platens and a considerable proportion of the product is spoiled when it is attempted to produce a relatively wide product at economical speeds.

According to the method of the present invention, this unsatisfactory condition of the product is obviated and a satisfactory product is produced economically notwithstanding the relatively great width thereof. The present method contemplates the provision of one or more expansion chambers or cavities in the filling at intermediate points in the width of the product. When only one such cavity is used, it is preferably substantially at the center of the product in a transverse direction. This expansion chamber or cavity may be formed, for example, by preventing or blocking off the supply of plastic filling to the space between the liner sheets at a desired intermediate point in the width of the product, so that no filling or at least less than the normal amount of filling is deposited between the liners at the desired intermediate point. This is illustrated in Fig. 6 of the accompanying drawing, showing an upper liner sheet 10, a lower liner sheet 11, a plastic filling or core 12, and a cavity 13 in the filling substantially at the center of the sheet in a transverse direction.

It is found that when this cavity is provided, according to the present invention, the above described distortion or splitting of the product does not occur. The exact reasons for this improved result are not known with certainty, but it seems probable that the expansion cavity 13 provides a chamber into which the vapor under pressure can flow to some extent, and from which it can escape through the somewhat porous liner sheets more readily than at points where the filling is in close contact with the liner sheets. Furthermore, the cavity forms an expansion chamber into which some of the filling may expand during the heating operation.

Whatever the exact reasons for the improved result may be, the fact is that actual use has demonstrated that when the method of this invention is used, the product does not become distorted and the liners are not forced away from each other after the product emerges from the platens, even when operating at economical commercial speeds. Furthermore, when the heat treatment is finished, the cavity originally left in the filling is found to be completely filled up by expansion of filling thereinto, so that there is no cavity present which might form any defect in the product.

Preferably the filling employed according to the present invention not only is plastic, but also is intumescent. For example, it may comprise a mixture of sodium silicate and a finely ground inorganic filler such as limestone or dolomite. Such a mixture is initially introduced between the liner sheets when it is of a somewhat dough-like consistency. Subsequent heating of the product causes this mixture to intumesce so that it becomes porous or filled with a multitude of relatively small cells, somewhat comparable in size and appearance to the cells of a loaf of bread. Continued heating hardens and sets the product so that it finally becomes rigid, strong, and water resistant, having a hardness comparable to that of stone. Fig. 7 illustrates a cross section through the product after the heat treatment thereof is finished, and illustrates diagrammatically not only the cellular nature of the filling or core when completed, but also shows, by comparison with Fig. 6, that the intumescent filling expands so that the core of the final product is substantially thicker than the layer of filling originally introduced between the liners. Fig. 7 also shows that the expansion cavity 13 disappears substantially completely during the intumescing operation by flow of part of the filling thereinto.

By using the method of the present invention, wallboard having paper liners and an intumescent filling of sodium silicate and ground limestone has been satisfactorily constructed in widths as great as eight feet, whereas without the use of the present method the attempt to produce wallboard of these materials in this width was frequently unsuccessful and resulted in a considerable proportion of board which became deformed after emerging from the platens.

When a product is made according to prior methods, without using the expansion cavity of the present invention, it is found that a strip of wallboard eight feet wide is frequently as much as fifty or sixty thousandths of an inch thicker near the center of the board than near the edges thereof, notwithstanding the fact that the filling material was originally distributed uniformly between the liners. A variation in thickness or "caliper" of this magnitude is often a serious defect. When the expansion cavity of the present invention is employed, however, it is found that the variation in caliper between the center and edges of an eight foot board does not exceed about ten or twelve thousandths of an inch, which is a great reduction from the previous variation of fifty or sixty thousandths. Also, when using the present invention the frictional resistance to moving the board through the platens is found to be materially less than previously, the board runs through the platens more smoothly, and the cellular structure of the board is greatly improved, the cells being smaller and more uniformly distributed, and the board being considerably stronger than similar boards made without the use of the present invention.

While the liner sheets, especially in the case of wallboard, are preferably permanently retained on the filling or core, this is not essential under all circumstances and it is contemplated that the invention may be used also in making a product which in its final form has no or only one liner sheet. Hence the words "liner sheet" and "liner" as used in this specification and in the accompanying claims are intended to include any sheet material used on either side of the filling, whether such use is permanent or temporary. For example, if the liners are to remain permanently attached to the filling, they may be of heavy paper, cloth, or other suitable material. If one or both liners are to be later removed from the filling, one or both of them may be formed from paper which is waxed or oiled to prevent it from sticking permanently to the filling, or of a strip or piece of metal which is greased or oiled likewise to prevent it from sticking permanently, and such liners may be stripped from the filling or core after emerging from the platens, Fig. 1 of the drawing illustrates somewhat diagrammatically a machine for carrying out the method of the present invention, this machine being designed particularly for the substantially continuous production of wallboard. The machine comprises a hopper having walls 15, which hopper is arranged to hold a supply of the plastic filling and to deliver it to the space between two spaced forming rolls 16 and 17. The liners 10 and 11 are drawn over the rolls 16 and 17 respectively, and down through the space between them. Where the liners are of paper, they may be in the form of long strips drawn from the rolls 18 and 19 respectively. Suitable mechanism is provided for rotating the forming rolls 16 and 17 so as to feed the paper downwardly between them, the plastic filling from the hopper being supplied to the space between the liners by gravity. The spacing of the rolls 16 and 17 will determine the amount of plastic filling introduced between the liners, and by adjusting the rolls closer to or farther away from each other, the filling can be made thinner or thicker.

The composite material comprising the two liners and the filling between them then travels as indicated by the line 20 to the platens, comprising a row of lower platens 21 and a row of upper platens 22, all preferably heated, as by means of steam, to a temperature of, say, from 120° C. to 180° C., for example. As the composite material passes between these platens, the heat of the platens heats the filling, vaporizes the mixture therein, and, if the filling is of an intumescent character as is preferably the case, causes it to intumesce. The material is confined between the platens, however, so that the expansion due to the intumescence is not unlimited but is held to the desired limits by contact with the platens. By setting the upper and lower platens closer to or farther away from each other, the amount of possible expansion of the product can be made less or greater, and thus the thickness of the final product can be controlled.

After the board has remained in the platens long enough to complete the intumescence of the filling and to cause it to harden partially, preferably moving continuously therethrough, it emerges from the platens, and the side edges of the board may be trimmed as by means of trim saws comprising rapidly revolving carborundum disks, indicated diagrammatically at 25. Also a saw such as a carborundum disk may be used to split the board longitudinally down the center, thus making two panels of four foot width from the original panel of eight foot width, for example.

After passing the trimming saws, the board enters a hardening oven 26 in which both sides of the board come into contact with hot gases which serve to harden it sufficiently so that it can be acted upon by the pull rolls without crushing. The oven may be maintained at a temperature of about 200° C. to 210° C., for example. In this hardening oven the board travels up a gradual incline (the slope of which is greatly exaggerated in Fig. 1 because of the breaking away of a considerable length of the hardening oven) to the pull rolls indicated generally by the numeral 27. These rolls, preferably rubber coated, grip the board firmly on top and bottom and furnish the necessary motive power for pulling it the entire distance from the forming rolls 16 and 17, through the platens 21 and 22, past the trim saws 25 and through the hardening oven 26.

Immediately after passing the pull rolls, the continuous strip of board may be cut into suitable lengths by any suitable cutoff apparatus indicated diagrammatically by the knife blade 28. The severed panels then pass down an inclined upper transfer 29 and drop upon an inclined lower transfer 30 from which they are fed onto a deck 31 of a processing oven 32 located preferably beneath the hardening oven 26 and the platens 21. This oven may likewise be maintained at a temperature of about 200° C. to 210° C., for example. The transfers 29 and 30 may be of any suitable construction such for example as that illustrated in United States Patent No. 1,778,095, granted October 14, 1930, for an invention of Charles A. Upson, or those shown in Upson British Patents No. 318,225 or No. 318,584.

The deck 31 preferably comprises feed rollers driven by suitable motive power so that the sections of board are carried along the deck to the opposite end of the processing oven 32, at which point they may pass down another upper transfer 33 onto a lower transfer 34 which may be similar to or identical with the upper and lower transfers 29 and 30, respectively. From the lower transfer 34 the board pases along another deck 35, preferably riding on driven rollers, also within the processing oven 32 and beneath the deck 31, and it finally emerges from the oven onto the delivery platform 36 shown at the extreme right hand end of Fig. 1.

The travel of the material through the processing oven 32, in which the board is subjected to a relatively high temperature for a considerable length of time, results in making the board quite hard and water resistant to a high degree. Thus the final product is suitable for use as a wallboard and when so used it will not swell or shrink unduly on account of moisture.

According to the present invention, as above mentioned, the filling introduced between the liners 10 and 11 is not introduced uniformly throughout the entire width of the liners, but is blocked off at one or more intermediate points so that substantially less filling is introduced at those points and an expansion chamber or cavity is provided. The means for accomplishing this preferably comprises a blocking means in the hopper to prevent flow of filling to the space between the liners at the desired predetermined points.

Referring to Figs. 2 to 4 inclusive, the blocking means may be in the form of a partition 40 of substantial thickness and of any suitable material, placed at the desired intermediate point in the hopper and held therein by any suitable means. For example, pairs of angle irons 41 may be secured to the walls 15 of the hopper in position to form a channel between them of the proper size to receive the partition 40, which may be a block of wood readily insertable in and removable from the channel by vertical movement. The lower end of the partition is shaped to conform comparatively closely to the rolls 16 and 17 and the liner sheets passing over them, so that little plastic material can ooze under the bottom edges of the partition and into the space which is intended to be blocked off.

Of course after each increment of material passes downwardly beyond the bottom end of the partition 40, there is no longer any partition present to prevent flow of filling into the cavity, and a slight amount of such flow will ordinarily take place, the amount thereof depending upon the stiffness of the plastic material. Nevertheless, in spite of this partial flow into the cavity, a cavity of substantial size actually does remain until the heating causes expansion of the filling.

When the filler is a mixture of sodium silicate and ground limestone, placed between paper liners eight feet wide, it is found in actual use that satisfactory results are obtained by using a partition 40 which is approximately 3½ inches thick. This thickness is given only as an example, however, and in some cases, it might be desirable to use a thicker or thinner partition, depending upon various factors such as the consistency of the filler mixture and the width of the board being formed.

Where a single partition located approximately in the center of the width of the board is not sufficient to produce the desired result, the internal pressure in the board during its formation may be further reduced and satisfactory results may be obtained by increasing the number of partitions to 2, 3, 4, or any other desired number. Fig. 5 illustrates the use of three partitions, the central partition 40 being retained and additional partitions 42 being placed approximately one-quarter of the width of the board inwardly from each edge thereof. These partitions may be held removably in channels formed of angle irons as in the case of the partition 40, and when they are not needed they may be simply lifted out of their channels.

The hopper preferably has adjustable false ends 45, as best shown in Figs. 2 and 4, which may be moved inwardly or outwardly to some extent by the adjusting screws 46 so that the width of plastic material fed between the liners may be adjusted minutely as desired.

In the construction above described, it will be seen that a machine has been provided which will produce wallboard substantially continuously, the raw materials being fed in at one end and the finished product emerging from the other. In this machine, the partition in the hopper serves to block off supply of the plastic filling to the space between the lines at an intermediate point in the width of the product, and this results in forming the desirable expansion chamber or cavity in the filling, which runs longitudinally of the board until the intumescence has progressed sufficiently to cause the cavity to fill up. This cavity is found to produce marked beneficial results, and to result in a superior product, as set forth above.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A machine for making products from plastic material, comprising spaced forming rolls, a hopper for supplying plastic material to the space between said rolls, and means associated with said hopper for blocking off supply of plastic material from said hopper to said space at an intermediate point in the length of said space.

2. A machine for making products from plastic material, comprising mechanism for guiding two strips of sheet material into a position adjacent to and spaced from each other, means for supplying plastic material to part of the space between said strips and for blocking off supply of plastic material to said space at an intermediate point in the width of said strips, and mechanism for heating said strips and plastic material.

3. A machine for making products from plastic material, comprising mechanism for guiding two strips of sheet material into a position adjacent to and spaced from each other, means for introducing plastic material into the space between said strips throughout the major portion of the width thereof and for substantially blocking off introduction of plastic material into said space at an intermediate point in the width thereof to provide a pressure-relieving cavity, and platens for heating said strips and interposed plastic material.

4. A machine for making wallboard comprising forming mechanism for guiding two strips of sheet material into a position adjacent to and spaced from each other, means for supplying plastic material to the space between said strips throughout the major portion of the width thereof while substantially blocking off supply of plastic material to said space at a point substantially inwardly of the edges of said strips to provide a pressure-relieving cavity, and heating means for heating said strips and the interposed plastic material.

5. A machine for making products from plastic material, comprising spaced forming rolls, hopper means for supplying plastic material to the space between said rolls, and partition means of substantial thickness at an intermediate point in said hopper means for blocking off supply of plastic material to a predetermined intermediate point in the length of said space.

6. A machine for making products from plastic material, comprising spaced forming rolls, hopper means for supplying plastic material to the space between said rolls, and partition means of substantial thickness at an intermediate point in said hopper means for blocking off supply of plastic material to a predetermined intermediate point in the length of said space, an edge of said partition means being shaped to conform closely to the shape of said forming rolls and being closely adjacent thereto.

7. A machine for making products from plastic material, comprising spaced forming rolls, hopper means for supplying plastic material to the space between said rolls, channel means associated with said hopper means at a point intermediate the ends thereof, and partition means removably retained in said channel means for blocking off supply of plastic material to a predetermined portion of said space at a point intermediate the ends thereof.

8. A machine for making products from plastic material comprising forming mechanism for placing plastic material between liner sheets throughout the major portion of the width thereof while substantially omitting plastic material from said liner sheets at a predetermined intermediate point in the width thereof, heated platens for confining and heating the liner sheets and the plastic material therebetween, and means for moving said liner sheets and plastic material substantially continuously from said forming mechanism to and through said platens.

9. A machine for making wallboard substantially continuously, comprising forming rolls for guiding two strips of sheet material into a position adjacent to and spaced from each other, hopper means for supplying plastic material to the space between said strips, means associated with said hopper means for blocking off supply of plastic material to an intermediate portion of said space between said strips to provide a pressure-relieving cavity in said plastic material at a point substantially inwardly of the edges of said strips, heated platens for confining and heating said strips and the plastic material between them, and means for moving said strips and plastic material substantially continuously from said forming rolls to and through said platens.

FRANCIS W. HARNEY.